US011856628B2

(12) United States Patent
Bathwal et al.

(10) Patent No.: US 11,856,628 B2
(45) Date of Patent: Dec. 26, 2023

(54) METHOD AND APPARATUS FOR DECOMPRESSION FAILURE OF TRANSMISSION OF SPLIT COMPRESSED DATA PACKET

(71) Applicant: QUALCOMM Incorporated, San Diego, CA (US)

(72) Inventors: Saket Bathwal, Hyderabad (IN); Leena Zacharias, San Jose, CA (US); Gang Andy Xiao, San Diego, CA (US); Rudhir Varna Upretee, San Diego, CA (US); Venukant Sahu, Hyderabad (IN); Vinay Rajkumar Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/195,410

(22) Filed: Mar. 8, 2021

(65) Prior Publication Data

US 2022/0287125 A1 Sep. 8, 2022

(51) Int. Cl.
*H04W 76/16* (2018.01)
*H04L 1/1867* (2023.01)
(Continued)

(52) U.S. Cl.
CPC ........... *H04W 76/16* (2018.02); *H04L 1/1896* (2013.01); *H04W 28/04* (2013.01); *H04W 28/06* (2013.01); *H04W 80/02* (2013.01)

(58) Field of Classification Search
CPC ..... H04W 76/16; H04W 28/04; H04W 28/06; H04W 80/02; H04W 76/15; H04L 1/1896; H04L 1/00
See application file for complete search history.

(56) References Cited

U.S. PATENT DOCUMENTS

2007/0165635 A1* 7/2007 Zhang .................... H04L 69/22
370/477
2015/0195796 A1* 7/2015 Sivanesan ........... H04W 52/146
370/329

(Continued)

OTHER PUBLICATIONS

International Search Report and Written Opinion—PCT/US2022/012597—ISA/EPO—dated Jun. 8, 2022.

(Continued)

*Primary Examiner* — Mandish K Randhawa
(74) *Attorney, Agent, or Firm* — Procopio, Cory, Hargreaves & Savitch

(57) ABSTRACT

A wireless device with dual connectivity may transmit split bearer traffic including a plurality of compressed data packets respectively to a first RLC entity of a first base station and a second RLC entity of a second base station and measure BLERs of the transmitted split bearer traffic. Based on the measured BLERs of the transmitted split bearer traffic, the wireless device may transmit uncompressed data packets to one or more of the first RLC entity or the second RLC entity. The wireless device may also reset a context memory and transmit the uncompressed data packets to the first RLC entity and the second RLC entity. A base station with dual connectivity may configure an LTE RLC entity with an RLC out-of-order delivery to deliver the received compressed data packets to an NR-PDCP entity without reordering the compressed data packets at the LTE RLC entity.

18 Claims, 8 Drawing Sheets

(51) Int. Cl.
    *H04W 28/04*    (2009.01)
    *H04W 28/06*    (2009.01)
    *H04W 80/02*    (2009.01)

(56) References Cited

U.S. PATENT DOCUMENTS

| | | | |
|---|---|---|---|
| 2015/0319678 A1* | 11/2015 | Johansson | H04L 1/0057 |
| | | | 370/335 |
| 2016/0241685 A1* | 8/2016 | Shah | H04W 28/06 |
| 2017/0006496 A1 | 1/2017 | Jung et al. | |
| 2020/0367311 A1* | 11/2020 | Choi | H04W 76/16 |
| 2022/0038951 A1* | 2/2022 | Jo | H04W 28/06 |

OTHER PUBLICATIONS

Partial International Search Report—PCT/US2022/012597—ISA/EPO—dated Apr. 11, 2022.
Samsung: "RoHC Support in Split/Duplication Bearer", 3GPP TSG-RAN WG2 NR Ad hoc 1801, 3GPP Draft, R2-1801498 RoHC in Split Bearer, 3rd Generation Partnership Project (3gpp), vol. RAN NG2, No. Vancouver, Canada, Jan. 22, 2018-Jan. 26, 2018, 2 Pages, Jan. 12, 2018 (Jan. 12, 2018), XP051386894, Retrieved from the Internet: URL: http://www.3gpp.org/ftp/tsg%5Fran/WG2%5FRL2/TSGR2%5FAHS/2018%5F01%5FNR/DOCS/ [retrieved on Jan. 12, 2018] the whole document.

\* cited by examiner

METHOD AND APPARATUS FOR DECOMPRESSION FAILURE OF TRANSMISSION OF SPLIT COMPRESSED DATA PACKET

BACKGROUND

Technical Field

The present disclosure relates generally to communication systems, and more particularly, to a method for reducing decompression failure of transmission of split compressed data packets

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication of a wireless device with dual connectivity may include transmitting split bearer traffic including compressed data packets respectively to a first radio link control (RLC) entity of a first base station and a second RLC entity of a second base station, measuring block error rates (BLERs) of the split bearer traffic including the compressed data packets transmitted to the first RLC entity and the second RLC entity, and transmitting one or more uncompressed data packets to one or more of the first RLC entity or the second RLC entity based on the measured BLERs of the transmitted split bearer traffic.

The UE may determine whether the BLERs of the split bearer traffic transmitted to one or more of the first RLC entity or the second RLC entity are greater than or equal to a threshold BLER value for a time duration, and transmit one or more uncompressed data packets to one or more of the first RLC entity or the second RLC entity corresponding to the BLERs of the transmitted split bearer traffic that are greater than or equal to the threshold BLER value for the time duration. Also, the UE may compare the BLERs of the split bearer traffic transmitted to the first RLC entity and the second RLC entity to determine whether a difference between the BLERs of the split bearer traffic transmitted to the first RLC entity and the split bearer traffic transmitted to the second RLC entity is greater than or equal to a threshold delta value for a time duration and transmitting one or more uncompressed data packets to the first RLC entity corresponding to a greater BLER in response to determining that the difference between the BLERs of the split bearer traffic transmitted to the first RLC entity and the split bearer traffic transmitted to the second RLC entity is greater than or equal to the threshold delta value for the time duration.

The method may further include monitoring channel conditions of the split bearer traffic transmitted to the first RLC entity and the second RLC entity in response to transmitting the one or more uncompressed data packets, and transmitting one or more compressed data packets to the first RLC entity and the second RLC entity in response to the channel condition being higher than a threshold condition value. The channel condition may include one or more of signal-to-noise ratio (SNR), signal-to-interference plus noise ratio (SINR), received signal strength indicator (RSSI), reference signal received power (RSRP), reference signal received quality (RSRQ), or BLER.

The UE may reset a context memory based on negative acknowledgment (NACK) signals received from one or more of the first RLC entity or the second RLC entity and transmit uncompressed data packets to the first RLC entity or the second RLC entity in response to resetting the context memory based on the NACK signals received from one or more of the first RLC entity or the second RLC entity, where the compressed data packets are compressed using a robust header compression (RoHC). The UE may also reset context memory based on receiving a feedback data packet indicating decompression failure from a New Radio (NR) packet data convergence protocol (PDCP) (NR-PDCP) entity and transmit uncompressed data packets to the first RLC entity or the second RLC entity in response to receiving the feedback data packet indicating decompression failure from the NR-PDCP entity, where the compressed data packets are compressed using an NR uplink data compression (UDC) (NR-UDC). The first RLC entity and the second RLC entity may be one of an LTE RLC entity and an NR RLC entity. Both RLC entities may be NR RLC.

In an aspect of the disclosure, a method of wireless communication of a base station with dual connectivity may include configuring, by an NR-PDCP entity of the first base station, an LTE RLC entity of the first base station with an RLC out-of-order delivery to deliver received compressed data packets to of the NR PDCP entity without reordering the received compressed data packets at the LTE RLC entity, receiving, from a wireless device, split bearer traffic including compressed data packets through an LTE RLC entity and an NR RLC entity, and performing the RLC out-of-order delivery based on NACK signals transmitted by the LTE RLC entity. The LTE RLC entity may be configured to perform the RLC out-of-order delivery in response to continuously transmitting the NACK signals for a set number of data packet transmissions or in response to a set number of the NACK signals transmitted within a set number of data packet transmissions being greater than or equal to a threshold value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
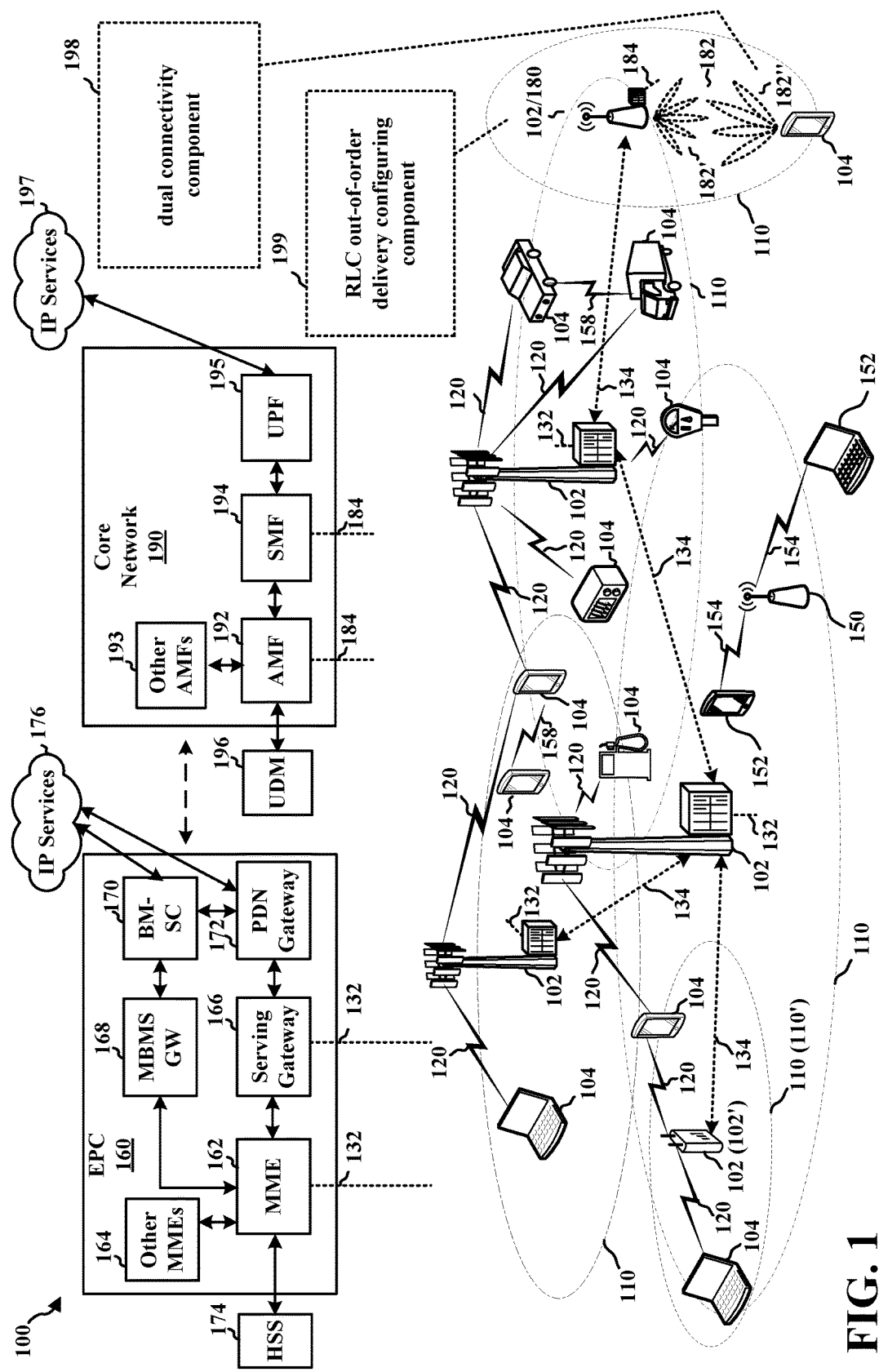
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a dual connectivity component 198 for reducing decompression failure configured to transmit split bearer traffic including a plurality of compressed data packets to a first RLC entity and a second RLC entity, measure BLERs of the transmitted split bearer traffic including the plurality of compressed data packets, and transmit one or more uncompressed data packets to at least one of the first RLC entity or the second RLC entity based on the measured BLERs. In certain aspects, the base station 180 may include an RLC out-of-order delivery configuring component 199 configured to receive, from a wireless device, split bearer traffic including a plurality of compressed data packets through an LTE RLC entity and an NR RLC entity, and configure the LTE RLC entity with an RLC out-of-order delivery to deliver the received plurality of compressed data packets to a PDCP entity of the NR bearer without reordering the received plurality of compressed data packets at the LTE RLC entity. Although the following description may be focused on 5G NR and LTE, the concepts described herein may be applicable to other similar areas, such as LTE-A, CDMA, GSM, and other wireless technologies.

Figure 2:
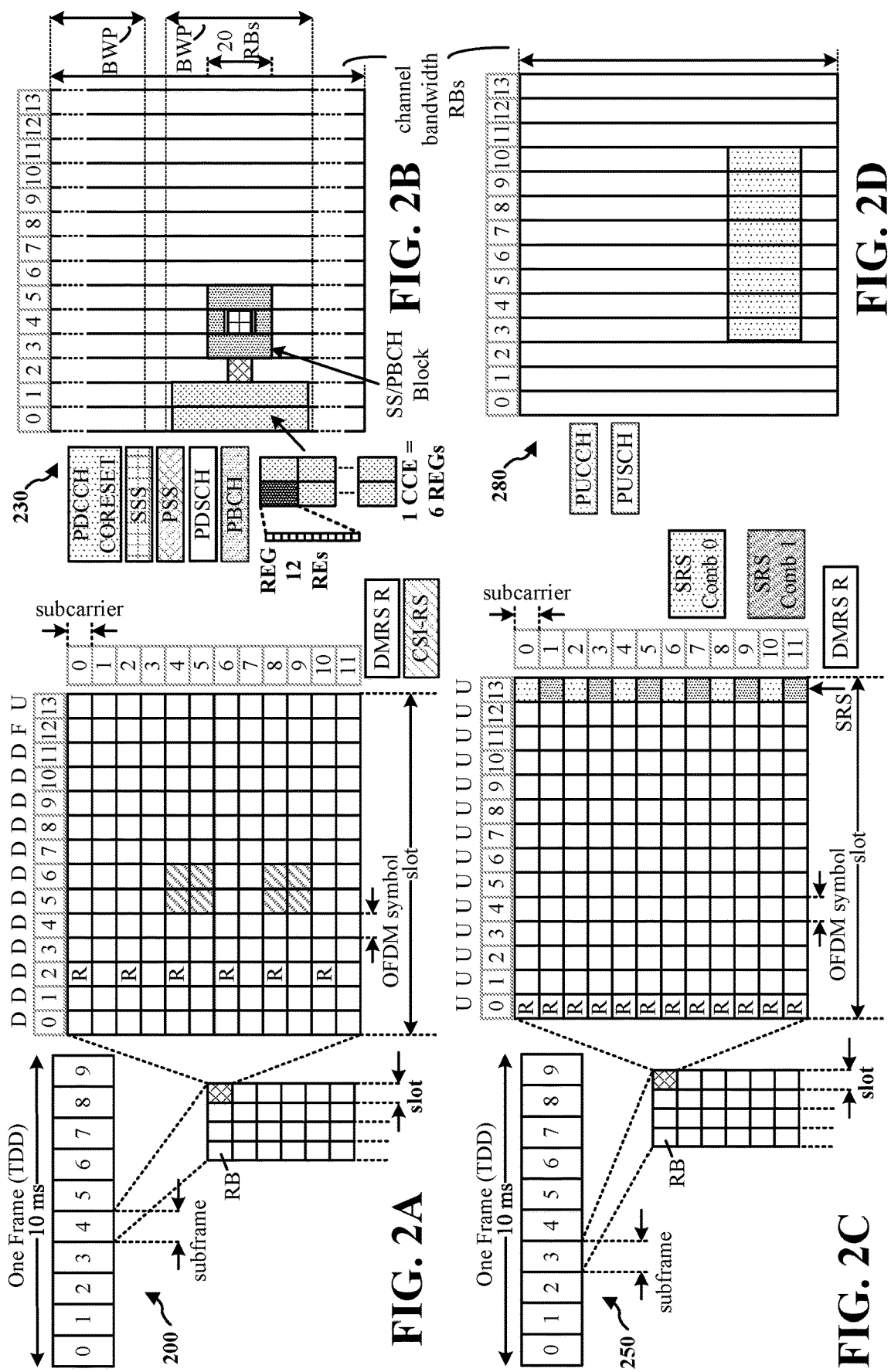
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
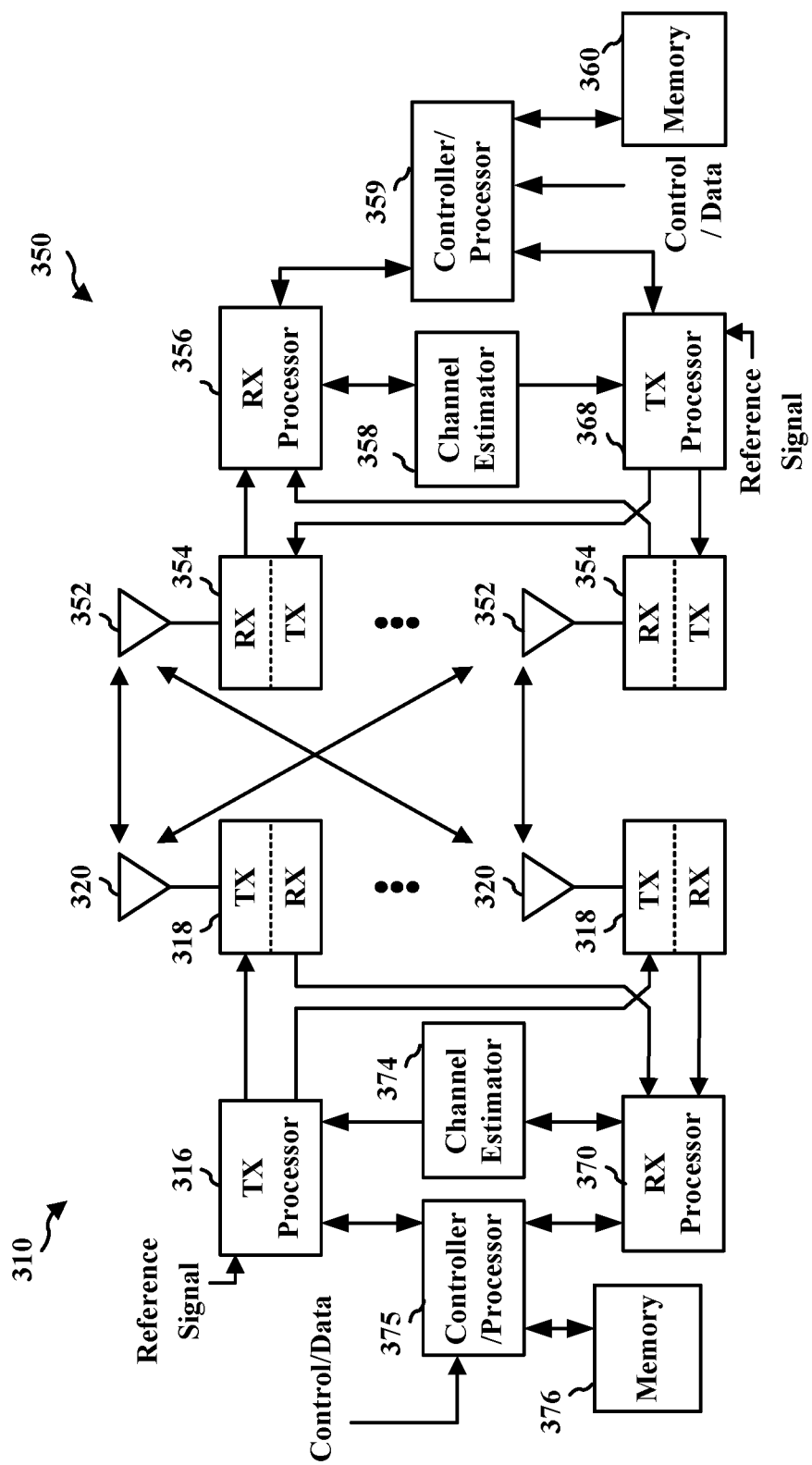
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the dual connectivity component 198 of FIG. 1. At least one of the TX processor 316, the RX processor 370, and the controller/processor 375 may be configured to perform aspects in connection with the RLC out-of-order delivery configuring component 199 of FIG. 1.

In some aspects, a UE and/or a RAN including a first base station and a second base station may have a dual connectivity configuration, and the data transmission between the UE and the first and second base stations may be transmitted on split data bearers with two radio access technology (RAT) specific RLC entities. That is, the data transmission may be transmitted on split bearers between the UE and the two RAT-specific RLC entities of the first base station and the second base station. In some aspects, the term "split bearer" refers to a radio bearer with RLC bearers in two or more RATs. Split bearer traffic may be traffic that is transmitted on a split radio bearer that has RLC bearers split among at least two different RATs. In a EUTRA-NR (EN) Dual Connectivity (DC) (EN-DC) configuration, the two RAT-specific RLC entities may include an LTE RLC entity and an NR RLC entity. In an NR-DC configuration, the two different RATs may include an NR FR1 RLC entity and an NR FR2 RLC entity. Furthermore, the two RAT-specific RLC entities may include two identical NR RLC entities. The data transmission between the UE and the RAN may be transmitted on one or more split bearers (also referred to as "split bearer traffic") between the UE and the two RAT-specific radio link control (RLC) entities, and the two RAT-specific RLC entities may communicate with the NR-PDCP entity.

Accordingly, in the EN-DC configuration, the NR-DC, or the configuration with two identical NRRLC entities, the two RAT-specific RLC entities may communicate with an NR-PDCP entity.

The RAN including the first and the second base stations may transmit split downlink (DL) data packets to the UE by scheduling the split transmission at the NR-PDCP entity level between two RAT-specific RLC entities to the UE via split bearers. In the EN-DC configuration, the NR-PDCP protocol data unit (PDU) may be split between the LTE RLC entity and the NR RLC entity and transmitted to the UE on the split bearers. In an NR-DC configuration, the NR-PDCP PDU may be split between the NR FR1 RLC entity and the NR FR2 RLC entity and transmitted to the UE on the split bearers. When the two RAT-specific RLC entities include the two identical NR RLC entities, the NR-PDCP PDU may be split between the two identical NR RLC entities and transmitted to the UE on the split bearers.

The UE may transmit split uplink (UL) data packets to the RAN via split bearers to the two RAT-specific RLCs entities and the two RAT-specific RLC entities may transmit the received UL data packets to the NR-PDCP entity. In the EN-DC configuration, the UE may transmit the split bearer traffic of the UL data packets to the LTE RLC entity and the NR RLC entity, and the LTE RLC entity and the NR RLC entity may transmit the received UL data packets to the NR-PDCP entity. In the NR-DC configuration, the UE may transmit the split bearer traffic of the UL data packets to the NR FR1 RLC entity and the NR FR2 RLC entity, and the NR FR1 RLC entity and the NR FR2 RLC entity may transmit the received UL data packets to the NR-PDCP entity. When the two RAT-specific RLC entities include the two identical NR RLC entities, the UE may transmit the split bearer traffic of the UL data packets to the two identical NR RLC entities, and the two NR RLC entities may transmit the received UL data packets to the NR-PDCP entity.

In some aspects, the transmitted UL data packets may be compressed by the UE, and the first and second base stations of the RAN may decompress the compressed UL data packets received from the UE. That is, the UE may compress the UL data packets and transmit the compressed UL data packets to the first and second base stations of the RAN. Accordingly, when the UE and the RAN including the first and second base stations have dual connectivity, the UE may compress the UL data packets, transmit split bearer traffic of the compressed UL data packets to the two RAT-specific RLC entities, the two RAT-specific RLC entities may transmit the received split compressed UL data packets to the NR-PDCP entity, and the NR-PDCP entity may decompress the compressed UL data packets received from the two RAT-specific RLC entities. For instance, the compression may include a RoHC and an NR-UDC.

In the EN-DC configuration, the UE may compress the UL data packets, transmit the split bearer traffic of compressed UL data packets to the LTE RLC entity and the NR RLC entity, the LTE RLC entity and the NR RLC entity may transmit the received compressed UL data packets to the NR-PDCP entity, and the NR-PDCP entity may decompress the compressed UL data packets received from the LTE RLC entity and the NR RLC entity. In the NR-DC configuration, the UE may compress the UL data packets, transmit split bearer traffic of compressed UL data packets to the NR FR1 RLC entity and the NR FR2 RLC entity, the NR FR1 RLC entity, and the NR FR2 RLC entity may transmit the received compressed UL data packets to the NR-PDCP entity, and the NR-PDCP entity may decompress the compressed UL data packets received from the NR FR1 RLC entity and the NR FR2 RLC entity.

In a dual connectivity configuration with the two identical NR RLC entities, the UE may transmit the split bearer traffic of the compressed UL data packets to the two identical NR RLC entities, and the two NR RLC entities may transmit the received compressed UL data packets to the NR-PDCP entity. The NR-PDCP entity may, in turn, decompress the compressed UL data packets received from the two NR RLC entities.

In some aspects, prior to decompressing the compressed UL data packets received from the two RAT-specific RLC entities, the NR-PDCP entity may reorder the compressed UL data packets received from the two RAT-specific RLC entities. That is, the NR-PDCP entity may reorder the split compressed UL data packets received from the UE via the two RAT-specific RLC entities and decompress the reordered compressed UL data packets. In some aspects, the NR-PDCP entity may configure a PDCP reordering timer to detect a loss of the PDCP PDU. That is, the NR-PDCP entity may allow the PDCP reordering timer to run until the compressed UL data packets are successfully reordered and may determine a decompression failure upon the expiration of the PDCP reordering timer.

In some aspects, some of the transmission of the UL data packets may be lost, causing UL data packet transmission failure. That is, the one or more of the first RLC entity or the second RLC entity may communicate a feedback signal to the UE to notify whether the UL data packet transmission succeeded or failed. In some aspects, the one or more of the first RLC entity or the second RLC entity may transmit an ACK signal to the UE to notify a successful transmission of the UL data packet, and the one or more of the first RLC entity or the second RLC entity may transmit a NACK signal to the UE to notify an unsuccessful transmission of the UL data packet.

In some aspects, the dual connectivity may include split bearer traffic of compressed UL data transmitted to two symmetric RAT-specific RLC entities or two asymmetric RAT-specific RLC entities, and the split UL data packets transmitted via the split bearers of compressed UL data transmitted to two symmetric or asymmetric RAT-specific RLC entities may have different rates of transmission failure due to the channel conditions or the properties of the corresponding RATs.

That is, the split bearer traffic of the compressed UL data packets transmitted to the first RAT-specific RLC entity may have a higher error rate than the split bearer traffic of the compressed UL data packets transmitted to the second RAT-specific RLC entity. When the UE transmits the split bearer traffic of the compressed UL data packets to the two RAT-specific RLC entities, the corresponding NR-PDCP entity may reorder the split compressed UL data packets received from the UE through the two RAT-specific RLC entities to decompress the reordered compressed UL data packets. However, due to the lost or delayed split compressed UL data packets transmitted via one of the two symmetric or asymmetric RAT-specific RLC entities, the NR-PDCP entity may determine the decompression failure upon the expiration of the PDCP reordering timer due to the split compressed UL data packets that are delayed or lost.

In some aspects, the UE and the first and second base stations may reduce the decompression failures at the NR-PDCP entity level due to the expiration of the PDCP reordering timer for decompressing compressed data transmission. That is, since the NR-PDCP entity may successfully decompress the received compressed UL data packets after reordering the UL data packets received from the two RAT-specific RLC entities, the UE may distribute the split data traffic to the two RAT-specific RLC entities in a manner that may reduce a number or time of the reordering at the NR-PDCP entity. By reducing the reordering specification or time at the NR-PDCP entity level, the RAN including the first base station, the second base station, or the UE may reduce the decompression errors due to the data packet loss or delay. The UE may continuously measure the BLERs of the split bearer traffic of the UL data packet transmission to the two RAT-specific RLC entities and determine to transmit one or more uncompressed data packets to one or more of the two RAT-specific RLC entity based on the measured BLERs of the transmitted split bearer traffic.

The UE may monitor the BLER based on the result of a cyclic redundancy check (CRC) evaluation used for inspecting the transmitted data packets at the RAN side, as indicated in the feedback from the first base station or the second base station. Particularly, the BLER may be measured or calculated as the number of erroneous data packets received at the first base station or the second base station divided by the total number of data packets transmitted from the UE and received at the first base station or the second base station. The UE may measure the BLER based on the NACK signals received from the first base station or the second base station notifying the unsuccessful transmission of the UL data packets.

The UE may continuously monitor the BLERs of the split bearer traffic of the UL data packet transmission to the two RAT-specific RLC entities and determine whether the BLERs of the split bearer traffic transmitted to at least one of the two RAT-specific RLC entities are greater than or equal to a threshold BLER value for a time duration. That is, the UE may measure the BLERs of the split bearer traffic of the UL data packet transmission to the two RAT-specific RLC entities and determine whether the measured BLERs of the split bearer traffic transmitted to at least one of the two RAT-specific RLC entities are greater than or equal to a threshold BLER value for a time duration. In response to detecting that the BLERs of the split bearer traffic transmitted to one or more of the two RAT-specific RLC entities are greater than or equal to a threshold BLER value for a time duration, the UE may transmit one or more uncompressed data packets to one or more of the two RAT-specific RLC entities corresponding to the BLERs of the transmitted split bearer traffic that are greater than or equal to the threshold BLER value for the time duration.

The UE may also continuously monitor the BLERs of the split bearer traffic of the UL data packet transmission to the two RAT-specific RLC entities and compare the BLERs of the split bearer traffic transmitted to the two RAT-specific RLC entities to determine whether a difference between the BLERs of the split bearer traffic transmitted to the two RAT-specific RLC entities is greater than or equal to a threshold delta value for a time duration. That is, the UE may measure the BLERs of the split bearer traffic of the UL data packet transmission to the two RAT-specific RLC entities and determine whether the difference between the BLERs of the split bearer traffic transmitted to the two RAT-specific RLC entities is greater than or equal to a threshold delta value for a time duration. In response to detecting that one split bearer traffic on a one RAT-specific RLC entity has a higher BLER with the BLER difference greater than or equal to the threshold delta value for a set time duration, the UE may consider sending uncompressed data packets to the one split bearer traffic transmitted to the one RAT-specific RLC entity with a higher BLER, while sending most of the compressed data packets on another split bearer traffic transmitted to the other RAT-specific RLC entity with a relatively lower BLER.

Accordingly, the UE may reduce the number or time of the reordering at the NR-PDCP entity and reduce the decompression failures at the NR-PDCP entity level of the RAN side due to the expiration of the PDCP reordering timer for decompressing compressed data transmission.

In some aspects, the UE may reset the transmission of the data packets in response to the feedback signal received from the RAN. In case the compressed data packets are compressed using the RoHC, the UE may reset the transmission of the data packets in response to NACK signals from one or more of the first base station or the second base station. In some aspects, in response to continuously receiving NACK signals or feedback signals from the one or more of the first base station or the second base station for a set number of compressed data packet transmissions, the UE may reset its context memory and start transmitting uncompressed data packets to the one or more of the first base station or the second base station. When the UE compresses the UL data packets and transmits the compressed UL data packets based on the RoHC, the UE may maintain a context memory and transmit a context packet to the one or more of the first base station or the second base station. The first base station or the second base station may also maintain a context memory on the first base station or the second base station side based on the context packet received from the UE. In response to receiving continuous NACK feedback for a set number of compressed data packet transmissions, the UE may determine to reset the context memory and restart the transmission of the uncompressed data packets to the two RAT-specific RLC entities and transmit a context packet to the one or more of the first base station or the second base station indicating the reset of the context packet. The one or more of the first base station or the second base station may receive the context packet indicating the reset of the context packet, correspondingly reset and update the context memory of the one or more of the first base station or the second base station side and receive the uncompressed data packets from the UE through the two RAT-specific RLC entities of the one or more of the first base station or the second base station.

In some aspects, the UE may reset its context memory and start transmitting uncompressed data packets to the one or more of the first base station or the second base station in response to determining that a number of the received NACK signals or feedback signals from the one or more of the first base station or the second base station for a set number of compressed data packet transmissions is greater than or equal to a threshold value. That is, the UE may monitor the number of the NACK signals or feedback signals received from the one or more of the first base station or the second base station, and the UE may determine that the number of the received NACK signals or feedback signals from the one or more of the first base station or the second base station for the set number of compressed data packet transmissions is greater than or equal to the threshold value. In response to determining that the number of the received NACK signals or feedback signals from the one or more of the first base station or the second base station for the set number of compressed data packet transmissions is greater than or equal to the threshold value, the UE may reset the context memory in response to determining that the NACK signals are continuously received for a set number of data packet transmissions.

In some aspects, the UE may determine to transmit uncompressed data packets to the first RLC entity and the second RLC entity in response to decompression failure received the NR-PDCP entity. In case the NR-PDCP entity determines the decompression failure of the compressed data packets compressed using the NR-UDC, the NR-PDCP entity may transmit a feedback data packet indicating decompression failure in response to transmitting the plurality of compressed data packets. The first base station or the second base station associated with the NR-PDCP entity may reset the context memory on the first base station or the second base station side in response to transmitting feedback data packet indicating decompression failure to the UE. The UE may determine to reset the context memory at the UE side in response to receiving the feedback data packet indicating decompression failure from the NR-PDCP entity and determine to start the transmission of the uncompressed data packets to the two RAT-specific RLC entities.

In response to transmitting the uncompressed data packets to the one or more of the first base station or the second base station, the UE may monitor one or more channel conditions of the split bearer traffic of the uncompressed data packets transmitted to the RAT-specific RLC entities and may determine to fall back to transmitting compressed data packets once the channel conditions are improved (i.e., above a certain predefined threshold). That is, in response to determining that the one or more channel conditions of the split bearer traffic of the uncompressed data packets transmitted to the first or second RLC entities are higher than threshold condition values, the UE may switch to transmitting compressed data packets to at least one of the two RAT-specific RLC entities. The channel condition may include SNR, SINR, RSSI, RSRP, RSRQ, or the BLER. Accordingly, the UE may monitor one or more of the SNR, the SINR, the RSSI, the RSRP, the RSRQ, or the BLER, and determine to switch back to transmitting compressed data packets to the one or more of the first base station or the second base station in response to determining that the SNR, the SINR, the RSSI, the RSRP, and/or the RSRQ are greater than or equal to the threshold condition values, or that the BLER is less than or equal to the threshold condition value.

Furthermore, in the EN-DC configuration, the LTE RLC entity may be configured to reorder the UL data packets received from the UE before transmitting the UL data packets to the NR-PDCP entity. That is, the LTE RLC entity may receive split UL data packets from the UE, reorder the received split UL data packets, and transmit the reordered split UL data packets to the NR-PDCP entity. Accordingly, when the UE transmits split compressed UL data packets to the LTE RLC entity, the LTE RLC entity may receive the split compressed UL data packets from the UE, reorder the received split compressed UL data packets, and transmit the reordered split compressed UL data packets to the NR-PDCP entity. The compressed data packets transmitted in the EN-DC configuration are transmitted on the split bearer traffic to the LTE RLC entity and the NR RLC entity, and the LTE RLC entity may first reorder the received data packets and transmit the reordered compressed packets to the NR-PDCP entity. The NR-PDCP entity may perform the NR-PDCP reordering of compressed data packets received from both the LTE RLC entity and the NR RLC entity first followed by the decompression. The NR-PDCP entity may not reorder the compressed data packets before receiving the reordered data packets from the LTE RLC entity. Therefore, there may be a higher chance of decompression failures when packet losses occur at the LTE RLC entity since the LTE RLC entity does not transmit the received data packets to the NR-PDCP entity until successfully reordering the received data packets at the LTE RLC entity level, and the reordering timer of the NR-PDCP entity may expire before the LTE RLC entity successfully reorder the compressed data packets received at the LTE RLC entity.

In some aspects, in the EN-DC configuration, the NR-PDCP entity may consider configuring the LTE RLC entity with the out-of-order delivery to reduce data packets lost and reduce the number of decompression failures. That is, the one or more of the first base station or the second base station may receive, from the UE, the split bearer traffic including a plurality of compressed data packets via the LTE RLC entity and the NR RLC entity, and configure the RLC entity of the LTE RLC entity with the RLC out-of-order delivery to deliver the received plurality of compressed data packets to a packet data convergence protocol (PDCP) layer of the NR RLC entity without reordering the received plurality of compressed data packets.

Figure 4:
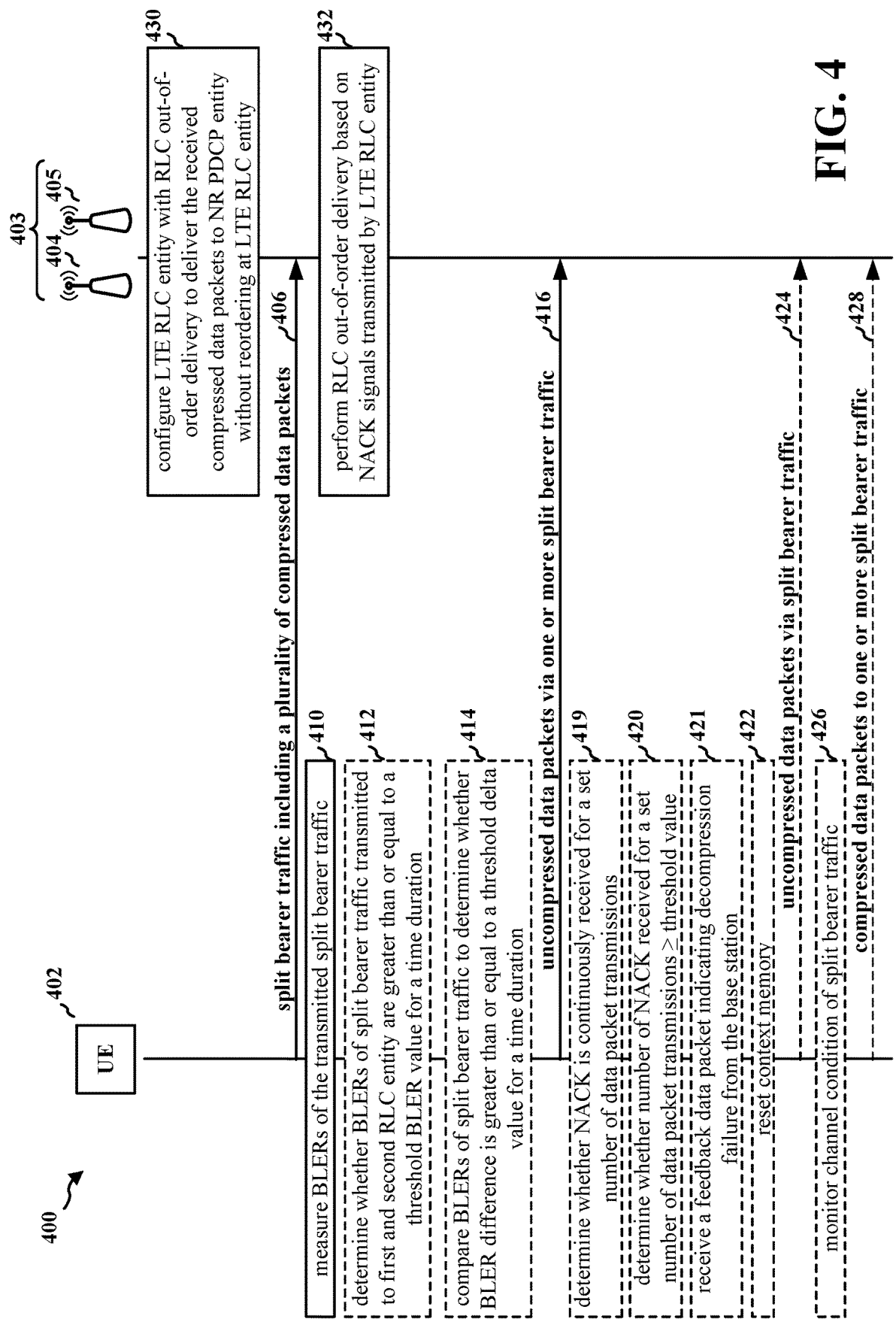
FIG. 4 is a call-flow diagram of a method of wireless communication.

FIG. 4 is a call-flow diagram 400 of a method of wireless communication. The call-flow diagram 400 may include a UE 402 and a RAN 403 including a first base station 404 and a second base station 405. At 406, the UE 402 may transmit split bearer traffic including a plurality of compressed data packets transmitted to a first RLC entity of the first base station 404 and a second RLC entity of the second base station 405. That is, the UE 402 and the RAN 403 including the first base station 404 and the second base station 405 may have a dual-carrier split functionality, and the UE 402 may transmit the split bearer traffic to the first RLC entity of the first base station 404 and the second RLC entity of the second base station, and the first and second RLC entities may transmit the received UL data packets to an NR-PDCP entity. One of the first RLC entity and the second RLC entity may be an LTE RLC entity. That is, the first RLC entity may be the LTE RLC entity, and the second RLC entity may be the NR RLC entity, or the first RLC entity may be the NR RLC entity and the second RLC entity may be the LTE RLC entity. Also, both of the first RLC entity and the second RLC entity may be the NR RLC entities. The plurality of compressed data packets may be compressed using a RoHC or an NR-UDC.

At 410, the UE 402 may measure BLERs of the split bearer traffic including the plurality of compressed data packets transmitted to the first RLC entity and the second RLC entity. The UE 402 may monitor the BLER of the split bearer traffic of the compressed UL data packet transmission to the two RAT-specific RLC entities based on the result of the CRC evaluation used for inspecting the transmitted compressed data packets at the first base station 404 and the second base station 405, as indicated in the feedback signal from the first base station 404 and the second base station 405.

At 412, based on the BLERs measured at 410, the UE 402 may determine whether the BLERs of the split bearer traffic of the compressed UL data packets transmitted to the first and second RLC entities are greater than or equal to a threshold BLER value for a time duration. In response to detecting that the BLERs of the split bearer traffic transmitted to one or more of the first and second RLC entities are greater than or equal to a threshold BLER value for a time duration, the UE 402 may transmit one or more uncompressed data packets to one or more of the first and second RLC entities corresponding to the BLERs of the transmitted split bearer traffic that are greater than or equal to the threshold BLER value for the time duration at 416.

At 414, based on the BLERs measured at 410, the UE 402 may also compare the BLERs of the split bearer traffic transmitted to the first and second RLC entities to determine whether a difference between the BLERs of the split bearer traffic transmitted to the first RLC entity and the second RLC entity is greater than or equal to a threshold delta value for a time duration. In response to detecting that a one split bearer traffic transmitted to one RLC entity has a higher BLER than the other with the BLER difference greater than or equal to the threshold delta value for a set time duration, the UE 402 may consider sending the uncompressed data packets to the one split bearer traffic transmitted to the one RAT-specific RLC entity with a higher BLER, while sending most of the compressed data packets on another split bearer traffic transmitted to the other RAT-specific RLC entity with a relatively lower BLER at 416.

At 416, the UE 402 may transmit one or more uncompressed data packets to one or more of the first RLC entity or the second RLC entity based on the measured BLERs of the split bearer traffic of the compressed UL data packets transmitted to the first and the second RLC entities. Referring to 412, the UE 402 may transmit one or more uncompressed data packets to one or more of the first and second RLC entities corresponding to the BLERs of the transmitted split bearer traffic that are greater than or equal to the threshold BLER value for the time duration, in response to detecting that the BLERs of the split bearer traffic transmitted to one or more of the first and second RLC entities are greater than or equal to a threshold BLER value for a time duration. Referring to 414, the UE 402 may consider sending the uncompressed data packets to the one split bearer traffic transmitted to the one RAT-specific RLC entity with a higher BLER while sending most of the compressed data packets on another split bearer traffic transmitted to the other RAT-specific RLC entity with a relatively lower BLER, in response to detecting that a one split bearer traffic transmitted to one RLC entity has a higher BLER than the other with the BLER difference greater than or equal to the threshold delta value for a set time duration.

At 419, the UE 402 may determine whether the NACK signal is continuously received from the first base station 404 or the second base station 405 for a set number of data packet transmissions in case the compressed data packets are compressed using the RoHC. In response to continuously receiving NACK signals or feedback signals from the first base station 404 or the second base station 405 for a set number of compressed data packet transmissions, the UE 402 may reset its context memory at 422 and start transmitting uncompressed data packets to the first base station 404 or the second base station 405 at 424.

At 420, the UE 402 may determine whether a number of the NACK signal received from the first base station 404 or the second base station 405 for a set number of data packet transmissions is greater than or equal to a threshold value in case the compressed data packets are compressed using the RoHC. In response to the number of the received NACK signals or feedback signals from the first base station 404 or the second base station 405 for a set number of compressed data packet transmissions being greater than or equal to the threshold value, the UE 402 may reset its context memory at 422 and start transmitting uncompressed data packets to the first base station 404 or the second base station 405 at 424.

At 421, the UE 402 may receive a feedback data packet indicating the decompression failure from the NR-PDCP entity of the first base station 404 or the second base station 405 in case the NR-PDCP entity determines the decompression failure of the compressed data packets compressed using the NR-UDC. The NR-UDC is a complete internet protocol (IP) compression, and therefore, the base station does not transmit NACK signal or feedback signal for each packet received. In response to receiving the feedback data packet indicating the decompression failure from the NR-PDCP entity, The UE 402 may determine to reset the context memory at the UE 402 side in response to receiving the feedback data packet indicating decompression failure from the NR-PDCP entity, and determine to start the transmission of the uncompressed data packets to the two RAT-specific RLC entities of the first base station 404 and the second base station 405.

At 422, the UE 402 may reset the context memory. Referring to 419, the UE 402 may reset the context memory in response to determining that the NACK signal is continuously received from the one or more of the first RLC entity or the second RLC entity for a set number of data packet transmissions. Referring to 420, the UE 402 may reset the context memory in response to determining that the number of the NACK signal received from the one or more of the first RLC entity or the second RLC entity for a set number of data packet transmissions is greater than or equal to the threshold value. Referring to 421, the UE 402 may reset the context memory in response to receiving the feedback data packet indicating the decompression failure from the NR-PDCP entity of the first base station 404 or the second base station 405. At 424, the UE 402 may transmit, to the first base station 404 or the second base station 405, one or more uncompressed data packets to the first RLC entity and the second RLC entity in response to resetting the context memory at 422.

At 426, in response to transmitting the one or more uncompressed data packets at 416 and/or 424, the UE 402 may monitor one or more channel conditions of the split bearer traffic transmitted to the first RLC entity and the second RLC entity to determine whether to fall back to transmitting the compressed data packets to the first and second RLC entities. That is, in response to determining that the channel condition of the split bearer traffic of the uncompressed data packets transmitted to the RAT-specific RLC entities of the first base station 404 or the second base station 405 is higher than a threshold condition value, the UE 402 may switch to transmitting compressed data packets to one or more of the first and second RLC entities. Accordingly, the UE 402 may monitor one or more of the SNR, the SINR, the RSSI, the RSRP, the RSRQ, or the BLER, and determine to switch back to transmitting compressed data packets to the first RLC entity of the first base station 404 and the second RLC entity of the second base station 405 at 428 in response to determining that the SNR, the SINR, the RSSI, the RSRP, and/or the RSRQ are greater than or equal to the threshold condition values, and/or the BLER is less than or equal to the threshold condition value.

At 428, the UE 402 may transmit one or more compressed data packets to the first RLC entity and the second RLC entity in response to the one or more channel conditions being higher than the threshold condition values.

At 430, the PDCP entity of the first base station 404 or the second base station 405 may configure the LTE RLC entity with an RLC out-of-order delivery to deliver the compressed data packets received from the UE 402 to the NR-PDCP entity without reordering the compressed data packets received at the LTE RLC entity. The PDCP entity may configure the LTE RLC entity to perform the RLC out-of-order delivery in response to continuously transmitting the NACK signal for a set number of data packet transmissions. The PDCP entity may also configure the LTE RLC entity to perform the RLC out-of-order delivery in response to a set number of NACK signals transmitted within a set number of data packet transmissions being greater than or equal to a threshold value.

At 432, in response to receiving, from the UE 402, split bearer traffic including a plurality of compressed data packets through the LTE RLC entity, the LTE RLC entity of may perform the RLC out-of-order delivery to deliver the compressed data packets received from the UE 402 to the NR-PDCP entity without reordering the compressed data packets received at the LTE RLC entity. The LTE RLC entity may perform the RLC out-of-order delivery in response to continuously transmitting the NACK signal for a set number of data packet transmissions. The LTE RLC entity may perform the RLC out-of-order delivery in response to a set number of NACK signals transmitted within a set number of data packet transmissions being greater than or equal to a threshold value.

Figure 5:
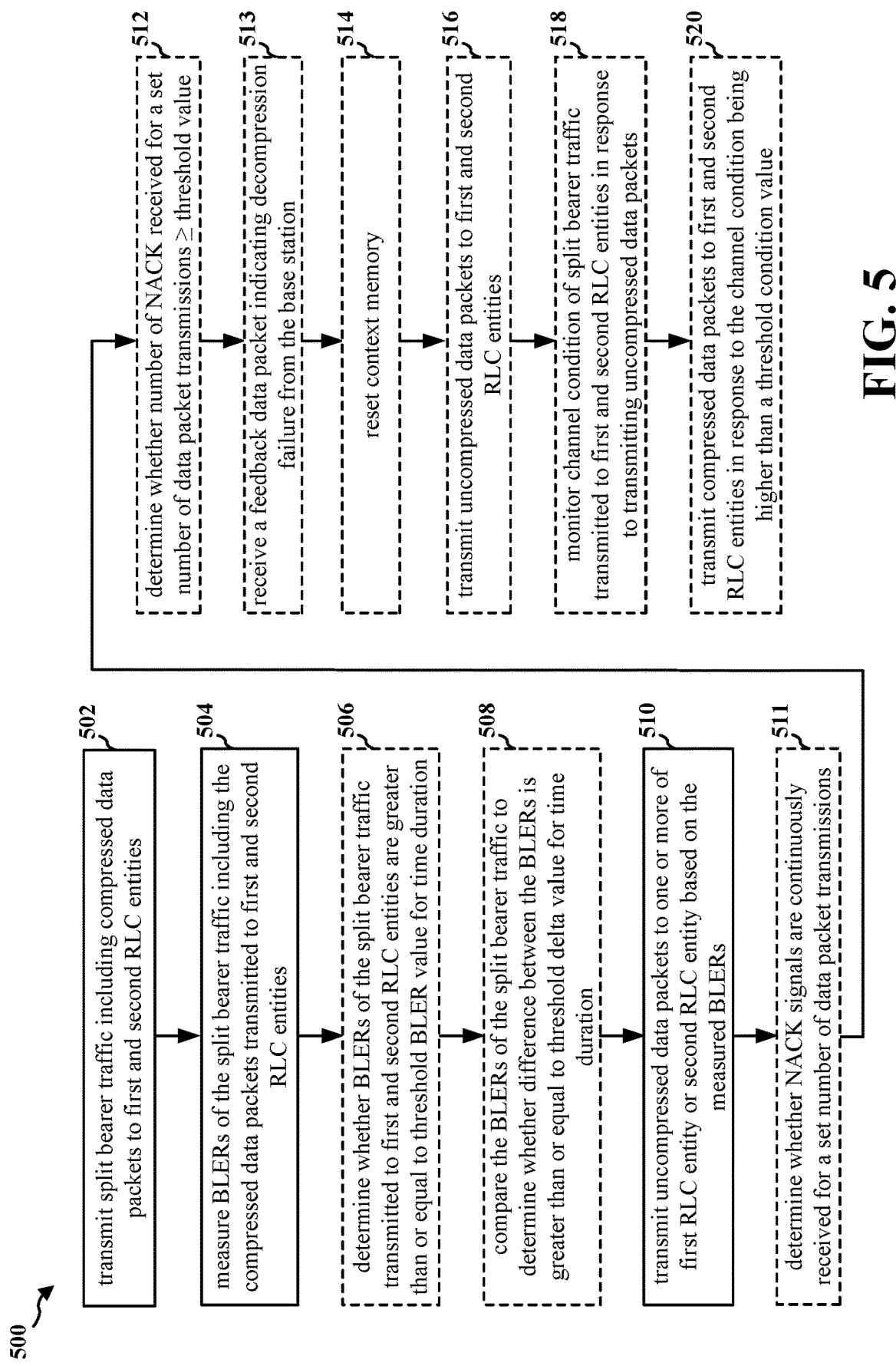
FIG. 5 is a flowchart of a method of wireless communication.

FIG. 5 is a flowchart 500 of a method of wireless communication. The method may be performed by a UE (e.g., the UE 104/402; the apparatus 702). At 502, the UE may transmit split bearer traffic including a plurality of compressed data packets to a first RLC entity of a first base station and a second RLC entity of a second base station (i.e., as at 406). For example, 502 may be performed by a dual connectivity component 740 and a UL data packet compression component 742.

At 504, the UE may measure BLERs of the split bearer traffic including the plurality of compressed data packets transmitted to the first RLC entity and the second RLC entity (i.e., as at 410). For example, 504 may be performed by a BLER component 744.

At 506, the UE may determine whether the BLERs of the split bearer traffic transmitted to one or more of the first RLC entity or the second RLC entity are greater than or equal to a threshold BLER value for a time duration (i.e., as at 412). For example, 506 may be performed by the BLER component 744.

At 508, the UE may compare the BLERs of the split bearer traffic transmitted to the first RLC entity and the second RLC entity to determine whether a difference between the BLER of the split bearer traffic transmitted to the first RLC entity and the BLER of the split bearer traffic transmitted to the second RLC entity is greater than or equal to a threshold delta value for a time duration (i.e., as at 414). For example, 508 may be performed by the BLER component 744.

At 510, the UE may transmit uncompressed data packets to one or more of the first RLC entity or the second RLC entity based on the measured BLERs of the transmitted split bearer traffic (i.e., as at 416). According to 506, the UE may transmit the uncompressed data packets to one or more of the first RLC entity or the second RLC entity corresponding to the BLERs of the transmitted split bearer traffic that are greater than or equal to the threshold BLER value for the time duration. According to 508, the UE may transmit the uncompressed data packets to the first RLC entity corresponding to a greater BLER in response to determining that the difference between the BLER of the split bearer traffic transmitted to the first RLC entity and the BLER of the split bearer traffic transmitted to the second RLC entity is greater than or equal to the threshold delta value for the time duration. For example, 510 may be performed by the dual connectivity component 740.

At 511, the UE may determine whether the NACK signal is continuously received for a set number of data packet transmissions in case the compressed data packets are compressed using the RoHC (i.e., as at 419). For example, 512 may be performed by the BLER component 744.

At 512, the UE may determine whether a number of the NACK signal received from one or more of the first RLC entity or the second RLC entity for a set number of data packet transmissions is greater than or equal to a threshold value in case the compressed data packets are compressed using the RoHC (i.e., as at 420). For example, 512 may be performed by the BLER component 744.

At 513, the UE may receive a feedback data packet indicating the decompression failure from the NR-PDCP entity in case the RN-PDCP entity determines the decompression failure of the compressed data packets compressed using the NR-UDC (i.e., as at 421). For example, 513 may be performed by the BLER component 744.

At 514, in response to 511, 512, and 513, the UE may reset a context memory. (i.e., as at 422). Referring to 511 and 512, the UE may reset the context memory based on the NACK signals received from the NR-PDCP entity. Referring to 513, the UE may reset the context memory in response to receiving the feedback data packet indicating the decompression failure from the NR-PDCP entity. For example, 514 may be performed by the dual connectivity component 740.

At 516, the UE may transmit uncompressed data packets via the first RLC entity and the second RLC entity in response to resetting the context memory at 514 (i.e., as at 424). For example, 516 may be performed by the dual connectivity component 740 and the UL data packet compression component 742.

At 518, in response to transmitting the one or more uncompressed data packets, the UE may monitor one or more channel conditions of the split bearer traffic transmitted to the first RLC entity and the second RLC entity to determine whether to fall back to transmitting the compressed data packets to the first and second RLC entities. (i.e., as at 426). The channel condition includes one or more of SNR, SINR, RSSI, RSRP, RSRQ, or BLER. Accordingly, the UE may monitor one or more of the SNR, the SINR, the RSSI, the RSRP, the RSRQ, or the BLER, and determine to switch back to transmitting compressed data packets to the first and second RLC entities at 520 in response to determining that the SNR, the SINR, the RSSI, the RSRP, and/or the RSRQ are greater than or equal to the threshold condition values, and/or the BLER is less than or equal to the threshold condition value. For example, 518 may be performed by a channel condition monitoring component 746.

At 520, the UE may transmit one or more compressed data packets to the first RLC entity and the second RLC entity in response to the channel condition being higher than a threshold condition value (i.e., as at 428). For example, 520 may be performed by the dual connectivity component 740 and the UL data packet compression component 742.

Figure 6:
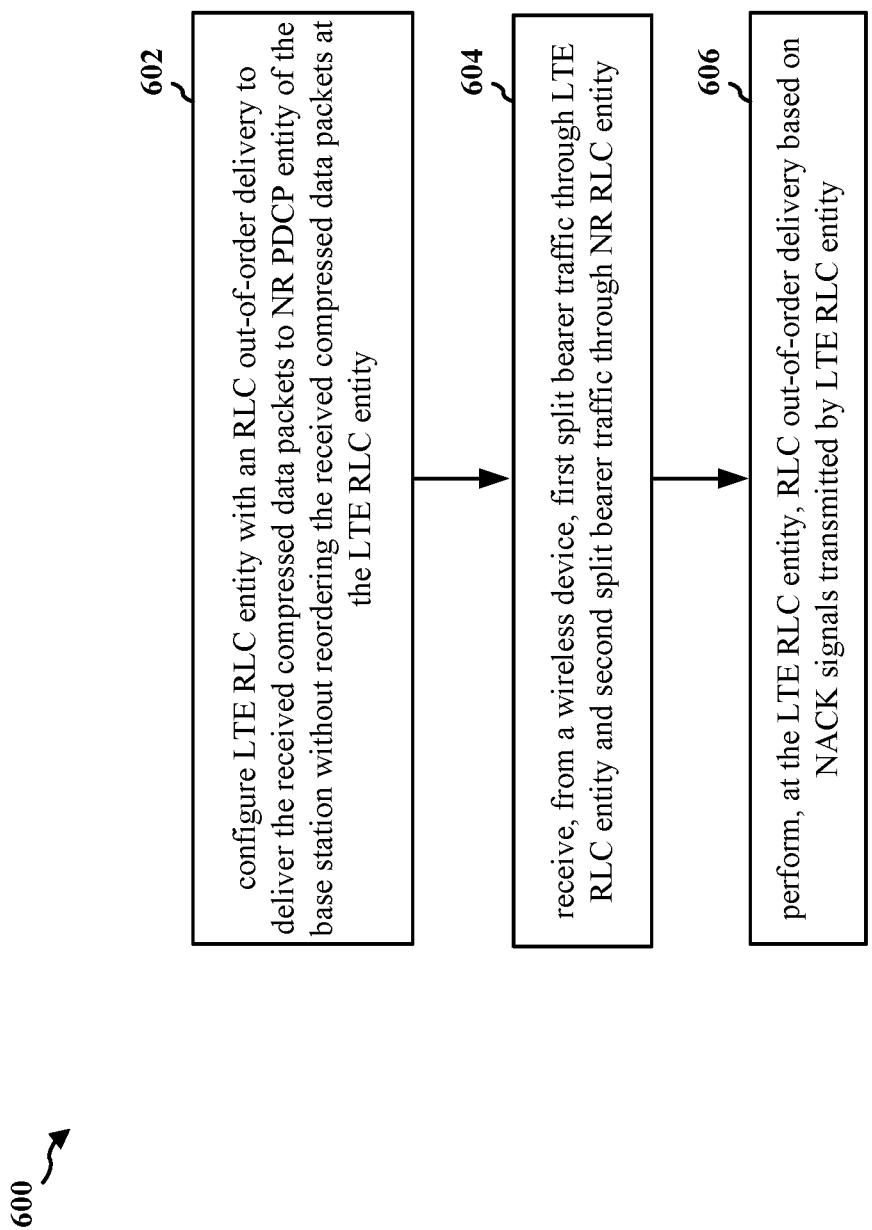
FIG. 6 is a flowchart of a method of wireless communication.

FIG. 6 is a flowchart 600 of a method of wireless communication. The method may be performed by a base station (e.g., the base station 102/180; the first base station 404; the second base station 405; the apparatus 802). At 602, the base station may configure an LTE RLC entity with an RLC out-of-order delivery to deliver the received plurality of compressed data packets to the NR-PDCP entity of the base station without reordering the received plurality of compressed data packets at the LTE RLC entity (i.e., as at 430). In one aspect, the LTE RLC entity may be configured to perform the RLC out-of-order delivery in response to continuously transmitting NACK signals for a set number of data packet transmissions. In another aspect, the LTE RLC entity may be configured to perform the RLC out-of-order delivery in response to a set number of NACK signals transmitted within a set number of data packet transmissions being greater than or equal to a threshold value. For example, 604 may be performed by an RLC out-of-order delivery configuring component 842.

At 604, the base station may receive split bearer traffic including a plurality of compressed data packets through the LTE RLC entity and an NR RLC entity of another base station (i.e., as at 406). The split bearer traffic may include a first split bearer traffic received by the LTE RLC and a second split bearer traffic transmitted received by the NR RLC entity of another base station. The NR-PDCP entity of the base station may receive, from the UE, the first split bearer traffic through the LTE RLC entity, and the NR-PDCP entity may receive the second split bearer traffic through the NRRLC entity of another base station. The LTE RLC entity may transmit the NACK signals in response to the transmission of the first split bearer traffic. For example, 602 may be performed by a dual connectivity component 840.

At 606, the LTE RLC entity of the base station may perform the RLC out-of-entity delivery based on the NACK signals transmitted by the LTE RLC entity (i.e., as at 432). In one aspect, the LTE RLC entity may be configured to perform the RLC out-of-order delivery in response to continuously transmitting NACK signals for a set number of data packet transmissions. In another aspect, the LTE RLC entity may be configured to perform the RLC out-of-order delivery in response to a set number of NACK signals transmitted within a set number of data packet transmissions being greater than or equal to a threshold value. For example, 606 may be performed by an RLC out-of-order delivery configuring component 842

Figure 7:
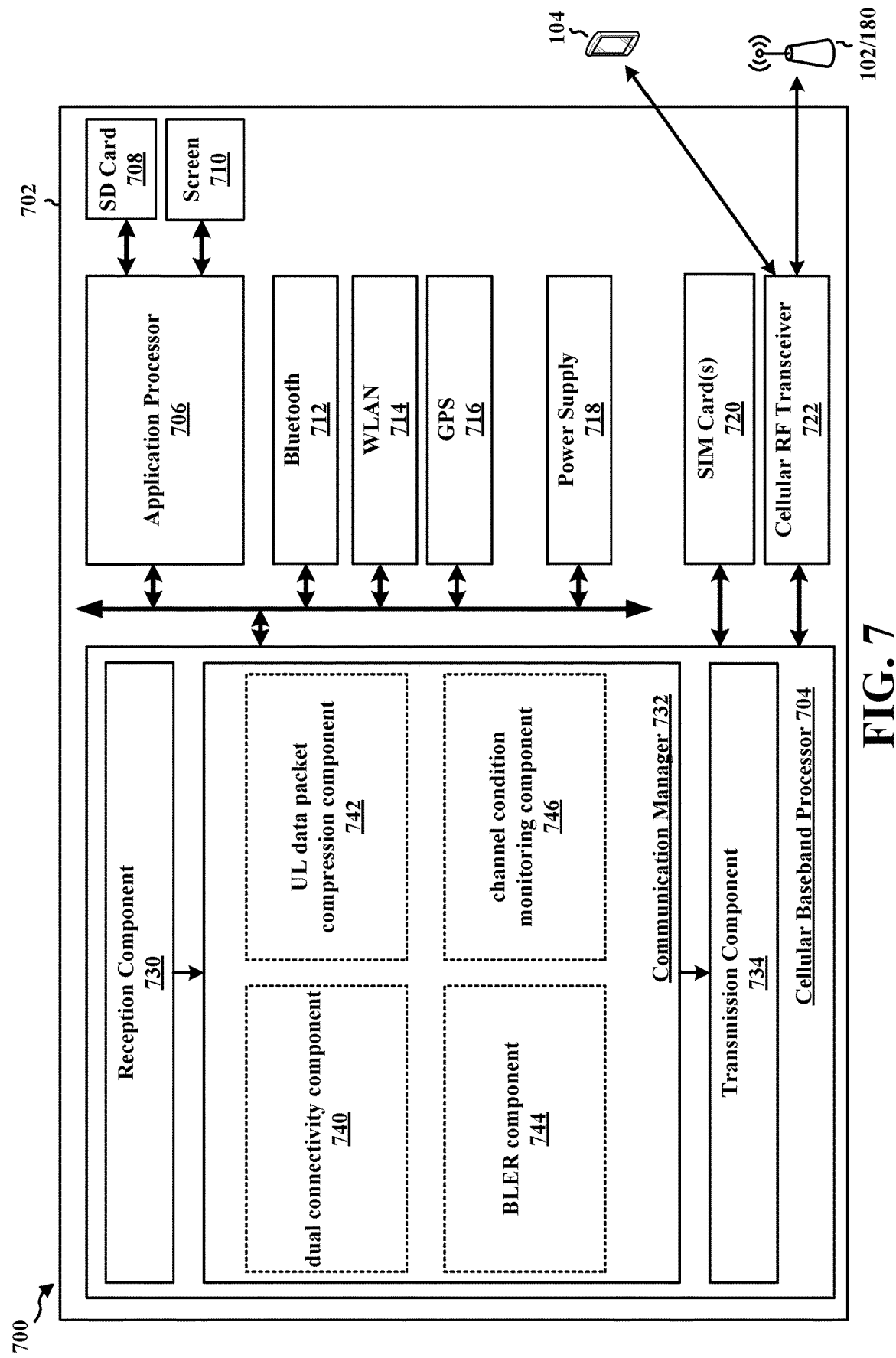
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or base station 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the aforediscussed additional modules of the apparatus 702.

The communication manager 732 includes a dual connectivity component 740 that is configured to transmit split bearer traffic including compressed data packets or and uncompressed data packets to a first RLC entity and a second RLC entity, receive a feedback data packet indicating the decompression failure from the base station, and reset a context memory, e.g., as described in connection with 502, 510, 514, 516, and 520. The communication manager 732 further includes a UL data packet compression component 742 that is configured to transmit split bearer traffic including compressed data packets to the base station, e.g., as described in connection with 502, 516, and 520. The communication manager 732 further includes a BLER component 744 that is configured to measure BLERs of the transmitted split bearer traffic, determine whether the measured BLERs are greater than or equal to a threshold BLER value for a time duration, compare the BLERs to determine whether a difference between the measured BLERs is greater than or equal to a threshold delta value for a time duration, determine whether the NACK signal is continuously received for a set number of data packet or a number of the NACK signal received within the set of number of data packets is greater than or equal to a threshold value, and receive a feedback data packet indicating the decompression failure from the base station, e.g., as described in connection with 504, 506, 508, 511, 512, and 513. The communication manager 732 further includes a channel condition monitoring component 746 that is configured to monitor the channel conditions of the split bearer traffic transmitted to the first RLC entity and the second RLC entity, e.g., as described in connection with 518. The components 740, 742, 744, and 746 are configured to communicate with each other.

The apparatus may include additional components that perform each of the blocks of the algorithm in the aforementioned flowcharts of FIGS. 4 and 5. As such, each block in the aforementioned flowcharts of FIGS. 4 and 5 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for transmitting split bearer traffic including a plurality of compressed data packets respectively to a first radio link control (RLC) entity of a first base station and a second RLC entity of a second base station, means for measuring block error rates (BLERs) of the split bearer traffic including the plurality of compressed data packets transmitted to the first RLC entity and the second RLC entity, and means for transmitting one or more uncompressed data packets to at least one of the first RLC entity or the second RLC entity based on the measured BLERs of the transmitted split bearer traffic. The apparatus 702 includes means for determining whether the BLERs of the split bearer traffic transmitted to at least one of the first RLC entity or the second RLC entity are greater than or equal to a threshold BLER value for a time duration, and means for transmitting one or more uncompressed data packets to at least one of the first RLC entity or the second RLC entity corresponding to the BLERs of the transmitted split bearer traffic that are greater than or equal to the threshold BLER value for the time duration. The apparatus 702 includes means for comparing the BLERs of the split bearer traffic transmitted to the first RLC entity and the second RLC entity to determine whether a difference between the BLERs of the split bearer traffic transmitted to the first RLC entity and the split bearer traffic transmitted to the second RLC entity is greater than or equal to a threshold delta value for a time duration, and means for transmitting one or more uncompressed data packets to the first RLC entity corresponding to a greater BLER in response to determining that the difference between the BLERs of the split bearer traffic transmitted to the first RLC entity and the split bearer traffic transmitted to the second RLC entity is greater than or equal to the threshold delta value for the time duration. The apparatus 702 includes means for resetting a context memory based on negative acknowledgment (NACK) signals received from one or more of the first RLC entity or the second RLC entity in response to transmitting the plurality of compressed data packets and means for transmitting uncompressed data packets to the first RLC entity and the second RLC entity in response to resetting the context memory based on the NACK signals received from the one or more of the first RLC entity or the second RLC entity. The apparatus 702 includes means for determining whether the NACK signals are continuously received for a set number of data packet transmissions compressed using a RoHC and means for resetting the context memory in response to determining that the NACK signals are continuously received for a set number of data packet transmissions, or determining that a number of the NACK signals received within a set number of data packet transmissions is greater than or equal to a threshold value. The apparatus 702 includes means for receiving from a packet data convergence protocol (PDCP) entity, a feedback data packet indicating decompression failure in response to transmitting the plurality of compressed data packets compressed using an NR-UDC, means for resetting the context memory based on the feedback data packet received from the NR-PDCP entity, and means for transmitting uncompressed data packets to the first RLC entity and the second RLC entity in response to receiving the feedback data packet indicating decompression failure from the NR-PDCP entity. The apparatus 702 also includes means for monitoring channel conditions of the split bearer traffic transmitted to the first RLC entity and the second RLC entity in response to transmitting the one or more uncompressed data packets and means for transmitting one or more compressed data packets to the first RLC entity and the second RLC entity in response to the channel condition being higher than a threshold condition value. The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
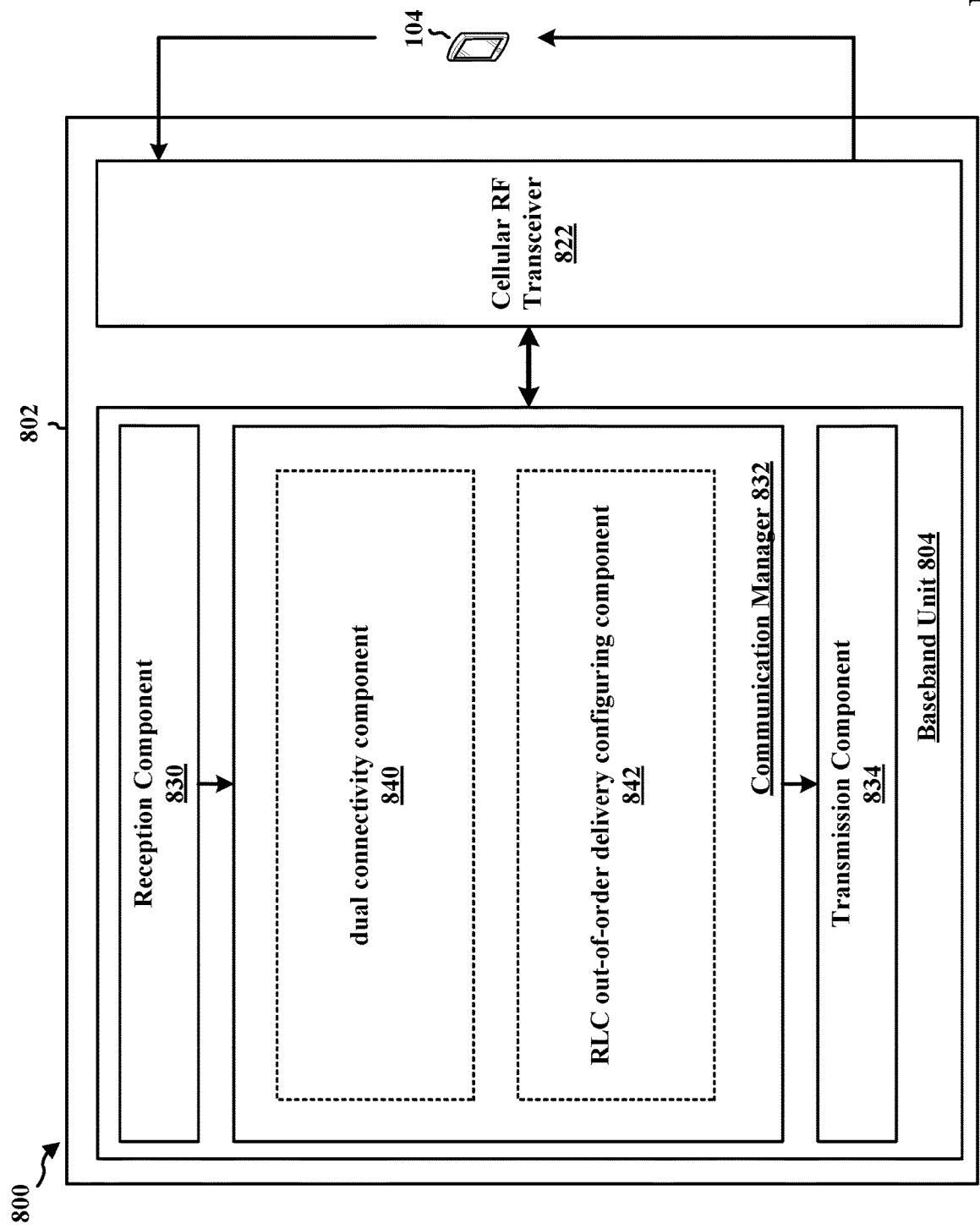
FIG. 8 is a diagram illustrating an example of a hardware implementation for an example apparatus.

FIG. 8 is a diagram 800 illustrating an example of a hardware implementation for an apparatus 802. The apparatus 802 is a base station and includes a baseband unit 804. The baseband unit 804 may communicate through a cellular RF transceiver 822 with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the base station 310 and may include the memory 376 and/or at least one of the TX processor 316, the RX processor 370, and the controller/processor 375.

The communication manager 832 includes a dual connectivity component 840 that is configured to receive split bearer traffic including a plurality of compressed data packets through the LTE RLC entity, e.g., as described in connection with 604. The communication manager 832 further includes an RLC out-of-order delivery configuring component 842 that is configured to configure an LTE RLC entity with an RLC out-of-order delivery to deliver the received plurality of compressed data packets to the NR-PDCP entity without reordering the received plurality of compressed data packets at the LTE RLC entity and perform, at the LTE RLC entity, the RLC out-of-entity delivery based on the NACK signals transmitted by the LTE RLC entity, e.g., as described in connection with 602 and 606. The components 840 and 842 are configured to communicate with each other.

The apparatus may include additional components that perform each of the blocks of the algorithm in the aforementioned flowcharts of FIGS. 4 and 6. As such, each block in the aforementioned flowcharts of FIGS. 4 and 6 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for configuring, by an NR-PDCP entity of the first base station, an LTE RLC entity of the first base station with an RLC out-of-order delivery to deliver received compressed data packets to of the NR PDCP entity without reordering the received compressed data packets at the LTE RLC entity, receiving, from a wireless device, split bearer traffic including a plurality of compressed data packets through an LTE RLC entity and an NR RLC entity, and performing the RLC out-of-order delivery based on NACK signals transmitted by the LTE RLC entity. The aforementioned means may be one or more of the aforementioned components of the apparatus 802 configured to perform the functions recited by the aforementioned means. As described supra, the apparatus 802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Referring again to FIGS. 4, 5, 6, 7, and 8, a method of wireless communication of a wireless device with dual connectivity may include transmitting split bearer traffic including compressed data packets respectively to a first RLC entity of a first base station and a second RLC entity of a second base station, measuring BLERs of the split bearer traffic including the compressed data packets transmitted to the first RLC entity and the second RLC entity, and transmitting one or more uncompressed data packets to one or more of the first RLC entity or the second RLC entity based on the measured BLERs of the transmitted split bearer traffic.

The UE may determine whether the BLERs of the split bearer traffic transmitted to one or more of the first RLC entity or the second RLC entity are greater than or equal to a threshold BLER value for a time duration, and transmit one or more uncompressed data packets to one or more of the first RLC entity or the second RLC entity corresponding to the BLERs of the transmitted split bearer traffic that are greater than or equal to the threshold BLER value for the time duration. Also, the UE may compare the BLERs of the split bearer traffic transmitted to the first RLC entity and the second RLC entity to determine whether a difference between the BLERs of the split bearer traffic transmitted to the first RLC entity and the split bearer traffic transmitted to the second RLC entity is greater than or equal to a threshold delta value for a time duration, and transmitting one or more uncompressed data packets to the first RLC entity corresponding to a greater BLER in response to determining that the difference between the BLERs of the split bearer traffic transmitted to the first RLC entity and the split bearer traffic transmitted to the second RLC entity is greater than or equal to the threshold delta value for the time duration.

The method may further include monitoring channel conditions of the split bearer traffic transmitted to the first RLC entity and the second RLC entity in response to transmitting the one or more uncompressed data packets, and transmitting one or more compressed data packets to the first RLC entity and the second RLC entity in response to the channel condition being higher than a threshold condition value. The channel condition may include one or more of SNR, SINR, RSSI, RSRP, RSRQ, or BLER.

The UE may reset a context memory based on NACK signals received from the one or more of the first RLC entity or the second RLC entity and transmit uncompressed data packets to the first RLC entity or the second RLC entity in response to resetting the context memory based on the NACK signals received from one or more of the first RLC entity or the second RLC entity, where the compressed data packets are compressed using a RoHC. The UE may also reset context memory based on receiving a feedback data packet indicating decompression failure from an NR-PDCP entity and transmit uncompressed data packets to the first RLC entity or the second RLC entity in response to receiving the feedback data packet indicating decompression failure from the NR-PDCP entity, where the compressed data packets are compressed using an NR-UDC. The first RLC entity and the second RLC entity may be one of an LTE RLC entity and an NR RLC entity.

A method of wireless communication of a base station with dual connectivity may include configuring, by an NR-PDCP entity of the first base station, an LTE RLC entity of the first base station with an RLC out-of-order delivery to deliver received compressed data packets to the NR PDCP entity without reordering the received compressed data packets at the LTE RLC entity, receiving, from a wireless device, split bearer traffic including compressed data packets through an LTE RLC entity and an NR RLC entity, and performing the RLC out-of-order delivery based on NACK signals transmitted by the LTE RLC entity The LTE RLC entity may be configured to perform the RLC out-of-order delivery in response to continuously transmitting NACK signals for a set number of data packet transmissions or in response to a set number of the NACK signals transmitted within a set number of data packet transmissions being greater than or equal to a threshold value.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a wireless device with dual connectivity. The method includes transmitting split bearer traffic including a plurality of compressed data packets respectively to a first RLC entity of a first base station and a second RLC entity of a second base station, measuring BLERs of the split bearer traffic including the plurality of compressed data packets transmitted to the first RLC entity and the second RLC entity, and transmitting one or more uncompressed data packets to at least one of the first RLC entity or the second RLC entity based on the measured BLERs of the transmitted split bearer traffic.

Aspect 2 is the method of aspect 1, where transmitting the one or more uncompressed data packets to at least one of the first RLC entity or the second RLC entity based on the measured BLERs of the transmitted split bearer traffic includes determining whether the BLERs of the split bearer traffic transmitted to at least one of the first RLC entity or the second RLC entity are greater than or equal to a threshold BLER value for a time duration, and transmitting one or more uncompressed data packets to at least one of the first RLC entity or the second RLC entity corresponding to the BLERs of the transmitted split bearer traffic that are greater than or equal to the threshold BLER value for the time duration.

Aspect 3 is the method of aspect 1, where transmitting the one or more uncompressed data packets to at least one of the first RLC entity or the second RLC entity based on the measured BLERs of the transmitted split bearer traffic includes comparing the BLERs of the split bearer traffic transmitted to the first RLC entity and the second RLC entity to determine whether a difference between the BLERs of the split bearer traffic transmitted to the first RLC entity and the split bearer traffic transmitted to the second RLC entity is greater than or equal to a threshold delta value for a time duration, and transmitting one or more uncompressed data packets to the first RLC entity corresponding to a greater BLER in response to determining that the difference between the BLERs of the split bearer traffic transmitted to the first RLC entity and the split bearer traffic transmitted to the second RLC entity is greater than or equal to the threshold delta value for the time duration.

Aspect 4 is the method of any of aspects 1 to 3, further including resetting a context memory based on negative acknowledgment (NACK) signals received from one or more of the first RLC entity or the second RLC entity in response to transmitting the plurality of compressed data packets and transmitting uncompressed data packets to the first RLC entity and the second RLC entity in response to resetting the context memory based on the NACK signals received from the one or more of the first RLC entity or the second RLC entity, where the plurality of compressed data packets is compressed using a RoHC.

Aspect 5 is the method of aspect 4, where resetting the context memory based on the NACK signals further includes determining whether the NACK signals are continuously received for a set number of data packet transmissions, and resetting the context memory in response to determining that the NACK signals are continuously received for a set number of data packet transmissions.

Aspect 6 is the method of aspect 4, where resetting the context memory based on the NACK signals further includes determining whether a number of the NACK signals received within a set number of data packet transmissions is greater than or equal to a threshold value, and resetting the context memory in response to determining that the NACK signals are continuously received for a set number of data packet transmissions.

Aspect 7 is the method of any of aspects 1 to 3, further including receiving, from an NR-PDCP entity of the first base station, a feedback data packet indicating decompression failure in response to transmitting the plurality of compressed data packets, resetting a context memory based on the feedback data packet received from the NR-PDCP entity, and transmitting uncompressed data packets to the first RLC entity and the second RLC entity in response to receiving the feedback data packet indicating decompression failure from the NR-PDCP entity, where the plurality of compressed data packets is compressed using an NR-UDC.

Aspect 8 is the method of any of aspects 1 to 7, further including monitoring channel conditions of the split bearer traffic transmitted to the first RLC entity and the second RLC entity in response to transmitting the one or more uncompressed data packets, and transmitting one or more compressed data packets to the first RLC entity and the second RLC entity in response to the channel condition being higher than a threshold condition value.

Aspect 9 is the method of aspect 8, where the channel condition includes one or more of SNR, SINR, RSSI, RSRP, RSRQ, or BLER.

Aspect 10 is the method of any of aspects 1 to 9, where one RLC entity of the first RLC entity and the second RLC entity is an NR RLC entity, and another RLC entity of the first RLC entity and the second RLC entity is one of an LTE RLC entity or the NR RLC entity.

Aspect 11 is an apparatus for wireless communication including at least one processor coupled to a memory and configured to implement a method as in any of aspects 1 to 10.

Aspect 12 is an apparatus for wireless communication including means for implementing a method as in any of aspects 1 to 10.

Aspect 13 is a computer-readable medium storing computer executable code, where the code, when executed by a processor, causes the processor to implement a method as in any of aspects 1 to 10.

Aspect 14 is a method of wireless communication of a first base station with dual connectivity. The method includes configuring, by an NR-PDCP entity of the first base station, an LTE RLC entity of the first base station with an RLC out-of-order delivery to deliver received compressed data packets to of the NR PDCP entity without reordering the received compressed data packets at the LTE RLC entity, receiving, from a wireless device, split bearer traffic including a plurality of compressed data packets through the LTE RLC entity of the first base station and an NR RLC entity of a second base station, and performing the RLC out-of-order delivery based on NACK signals transmitted by the LTE RLC entity.

Aspect 15 is the method of aspect 14, where the LTE RLC entity is configured to perform the RLC out-of-order delivery in response to continuously transmitting the NACK signals for a set number of data packet transmissions.

Aspect 16 is the method of aspect 14, where the LTE RLC entity is configured to perform the RLC out-of-order delivery in response to a set number of the NACK signals transmitted within a set number of data packet transmissions being greater than or equal to a threshold value.

Aspect 17 is an apparatus for wireless communication including at least one processor coupled to a memory and configured to implement a method as in any of aspects 14 to 16.

Aspect 16 is an apparatus for wireless communication including means for implementing a method as in any of aspects 14 to 16.

Aspect 17 is a computer-readable medium storing computer executable code, where the code, when executed by a processor, causes the processor to implement a method as in any of aspects 14 to 16.

What is claimed is:

1. An apparatus for wireless communication at a wireless device with dual connectivity, comprising:
  memory; and
  at least one processor coupled to the memory and configured to:
    transmit split bearer traffic including a first plurality of compressed data packets respectively to a first radio link control (RLC) entity of a first base station and a second RLC entity of a second base station;
    measure block error rates (BLERs) of the split bearer traffic including the first plurality of compressed data packets transmitted to the first RLC entity and the second RLC entity; and
    transmit one or more uncompressed data packets to the first RLC entity and a second plurality of compressed data packets to the second RLC entity based on a difference between the BLERs of the split bearer traffic transmitted to the first RLC entity and the split bearer traffic transmitted to the second RLC entity is greater than or equal to a threshold delta value for a time duration.

2. The apparatus of claim 1, wherein the at least one processor is further configured to transmit the one or more uncompressed data packets to the first RLC entity based on the difference between the BLERs of the split bearer traffic transmitted to the first RLC entity and the split bearer traffic transmitted to the second RLC entity is greater than or equal to the threshold delta value for the time duration by:
  comparing the BLERs of the split bearer traffic transmitted to the first RLC entity and the second RLC entity to determine whether the difference between the BLERs of the split bearer traffic transmitted to the first RLC entity and the split bearer traffic transmitted to the second RLC entity is greater than or equal to the threshold delta value for the time duration; and
  transmitting the one or more uncompressed data packets to the first RLC entity corresponding to a greater BLER in response to determining that the difference between the BLERs of the split bearer traffic transmitted to the first RLC entity and the split bearer traffic transmitted to the second RLC entity is greater than or equal to the threshold delta value for the time duration.

3. The apparatus of claim 1, wherein the at least one processor is further configured to:
  reset a context memory based on a negative acknowledgment (NACK) signals received from at least one of the first RLC entity and the second RLC entity; and
  transmit the one or more uncompressed data packets to the first RLC entity in response to resetting the context memory based on the NACK signals received from the at least one of the first RLC entity and the second RLC entity,
  wherein the first plurality of compressed data packets is compressed using a robust header compression (RoHC).

4. The apparatus of claim 3, wherein the at least one processor is further configured to reset the context memory based on the NACK signals by:
  determining whether the NACK signals are continuously received for a set number of data packet transmissions; and
  resetting the context memory in response to determining that the NACK signals are continuously received for a set number of data packet transmissions.

5. The apparatus of claim 3, wherein the at least one processor is further configured to reset the context memory based on the NACK signals by:
  determining whether a number of the NACK signals received within a set number of data packet transmissions is greater than or equal to a threshold value; and
  resetting the context memory in response to determining that the NACK signals are continuously received for a set number of data packet transmissions.

6. The apparatus of claim 1, wherein the at least one processor is further configured to:
  receive, from a New-Radio (NR) packet data convergence protocol (PDCP) (NR-PDCP) entity of the first base station, a feedback data packet indicating decompression failure in response to transmitting the first plurality of compressed data packets;
  reset a context memory based on the feedback data packet received from the NR-PDCP entity; and
  transmit uncompressed data packets to the first RLC entity in response to receiving the feedback data packet indicating decompression failure from the NR-PDCP entity,
  wherein the first plurality of compressed data packets is compressed using a new radio (NR) uplink data compression (UDC) (NR-UDC).

7. The apparatus of claim 1, wherein the at least one processor is further configured to:
  monitor channel conditions of the split bearer traffic transmitted to the first RLC entity and the second RLC entity in response to transmitting the one or more uncompressed data packets; and
  transmit one or more compressed data packets to the first RLC entity and the second RLC entity in response to the channel condition being higher than a threshold condition value.

8. The apparatus of claim 7, wherein the channel condition includes at least one of signal-to-noise ratio (SNR), signal-to-interference plus noise ratio (SINR), received signal strength indicator (RSSI), reference signal received power (RSRP), reference signal received quality (RSRQ), or BLER.

9. The apparatus of claim 1, wherein one RLC entity of the first RLC entity and the second RLC entity is a new radio (NR) RLC entity, and another RLC entity of the first RLC entity and the second RLC entity is one of an LTE RLC entity or the NR RLC entity.

10. A method of wireless communication at a wireless device with dual connectivity, comprising:
  transmitting split bearer traffic including a first plurality of compressed data packets respectively to a first radio link control (RLC) entity of a first base station and a second RLC entity of a second base station;
  measuring block error rates (BLERs) of the split bearer traffic including the first plurality of compressed data packets transmitted to the first RLC entity and the second RLC entity; and
  transmitting one or more uncompressed data packets to the first RLC entity and a second plurality of compressed data packets to the second RLC entity based on a difference between the BLERs of the split bearer traffic transmitted to the first RLC entity and the split bearer traffic transmitted to the second RLC entity is greater than or equal to a threshold delta value for a time duration.

11. The method of claim 10, wherein transmitting the one or more uncompressed data packets to the first RLC entity based on the difference between the BLERs of the split bearer traffic transmitted to the first RLC entity and the split bearer traffic transmitted to the second RLC entity is greater than or equal to the threshold delta value for the time duration comprises:
  comparing the BLERs of the split bearer traffic transmitted to the first RLC entity and the second RLC entity to determine whether the difference between the BLERs of the split bearer traffic transmitted to the first RLC entity and the split bearer traffic transmitted to the second RLC entity is greater than or equal to the threshold delta value for the time duration; and
  transmitting the one or more uncompressed data packets to the first RLC entity corresponding to a greater BLER in response to determining that the difference between the BLERs of the split bearer traffic transmitted to the first RLC entity and the split bearer traffic transmitted to the second RLC entity is greater than or equal to the threshold delta value for the time duration.

12. The method of claim 10, further comprising:
  resetting a context memory based on negative acknowledgment (NACK) signals received from at least one of the first RLC entity or the second RLC entity in response to transmitting the first plurality of compressed data packets; and
  transmitting the uncompressed data packets to the first RLC entity in response to resetting the context memory based on the NACK signals received from the at least one of the first RLC entity or the second RLC entity,
  wherein the first plurality of compressed data packets is compressed using a robust header compression (RoHC).

13. The method of claim 12, wherein resetting the context memory based on the NACK signals further comprises:
  determining whether the NACK signals are continuously received for a set number of data packet transmissions; and
  resetting the context memory in response to determining that the NACK signals are continuously received for a set number of data packet transmissions.

14. The method of claim 12, wherein resetting the context memory based on the NACK signals further comprises:
  determining whether a number of the NACK signals received within a set number of data packet transmissions is greater than or equal to a threshold value; and
  resetting the context memory in response to determining that the NACK signals are continuously received for a set number of data packet transmissions.

15. The method of claim 10, further comprising:
  receiving, from a New-Radio (NR) packet data convergence protocol (PDCP) (NR-PDCP) entity of the first base station, a feedback data packet indicating decompression failure in response to transmitting the first plurality of compressed data packets;
  resetting a context memory based on the feedback data packet received from the NR-PDCP entity indicating the decompression failure; and
  transmitting uncompressed data packets to the first RLC entity in response to receiving the feedback data packet indicating decompression failure from the NR-PDCP entity,
  wherein the first plurality of compressed data packets is compressed using a new radio (NR) uplink data compression (UDC) (NR-UDC).

16. The method of claim 10, further comprising:
  monitoring channel conditions of the split bearer traffic transmitted to the first RLC entity and the second RLC entity in response to transmitting the one or more uncompressed data packets; and
  transmitting one or more compressed data packets to the first RLC entity and the second RLC entity in response to the channel condition being higher than a threshold condition value.

17. The method of claim 16, wherein the channel condition includes at least one of signal-to-noise ratio (SNR), signal-to-interference plus noise ratio (SINR), received signal strength indicator (RSSI), reference signal received power (RSRP), reference signal received quality (RSRQ), or BLER.

18. The method of claim 10, wherein one RLC entity of the first RLC entity and the second RLC entity is a new radio (NR) RLC entity, and another RLC entity of the first RLC entity and the second RLC entity is one of an LTE RLC entity or the NR RLC entity.

* * * * *